J. O. SCHWARTZ.
POWER TRANSMITTING MECHANISM.
APPLICATION FILED FEB. 10, 1910.

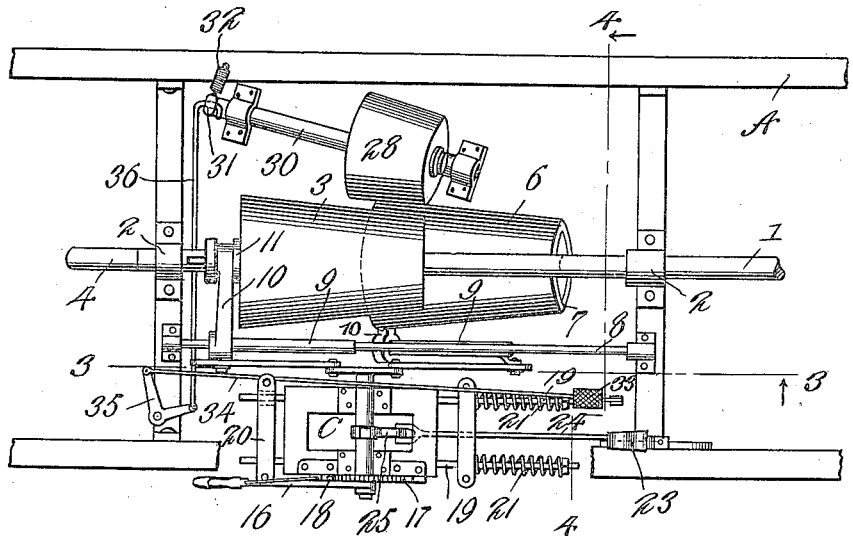

994,037.

Patented May 30, 1911.

3 SHEETS—SHEET 2.

Witnesses
Frank B. Hoffman
C. Brodway

Inventor
John O. Schwartz

By Victor J. Evans
Attorney

J. O. SCHWARTZ.
POWER TRANSMITTING MECHANISM.
APPLICATION FILED FEB. 10, 1910.
994,037.
Patented May 30, 1911.
3 SHEETS—SHEET 3.
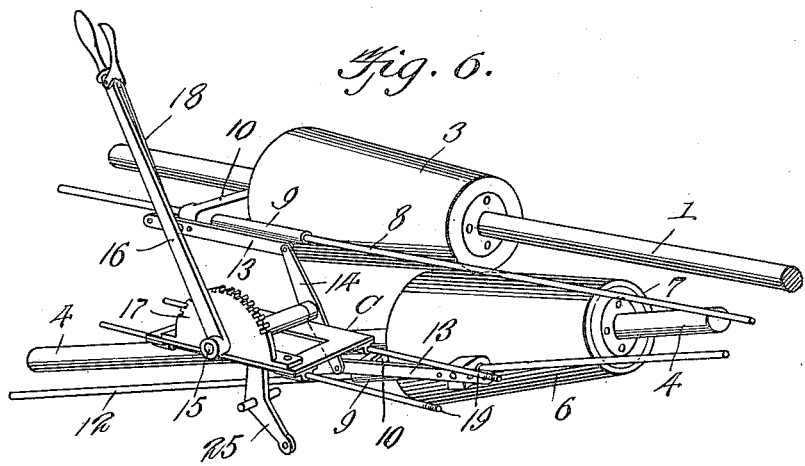
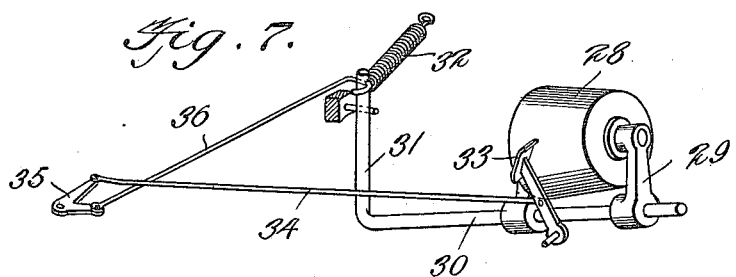
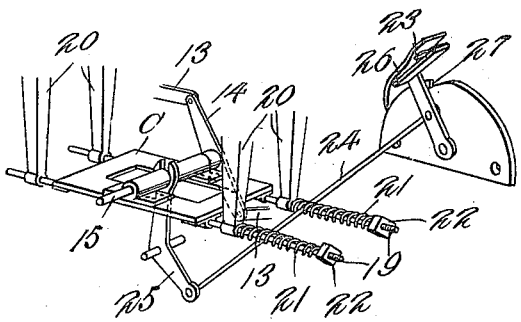
Witnesses
Frank B. Hoffman
C. Brodway
Inventor
John O. Schwartz
By Victor J. Evans
Attorney

UNITED STATES PATENT OFFICE.

JOHN O. SCHWARTZ, OF HOPE, INDIANA.

POWER-TRANSMITTING MECHANISM.

994,037.   Specification of Letters Patent.   Patented May 30, 1911.

Application filed February 10, 1910.   Serial No. 543,011.

*To all whom it may concern:*

Be it known that I, JOHN O. SCHWARTZ, a citizen of the United States, residing at Hope, in the county of Bartholomew and State of Indiana, have invented new and useful Improvements in Power-Transmitting Mechanism, of which the following is a specification.

This invention relates to a power transmitting mechanism of that type including frictionally engaged elements or cones for transmitting power from the driving to the driven shaft and while the mechanism is especially adapted for automobiles, it is not necessary to limit it to this use.

The invention has for one of its objects to improve and simplify the construction and operation of devices of this character so as to be comparatively simple and inexpensive to manufacture and keep in repair, reliable and efficient in use and adapted to be controlled with facility for changing the speed of propulsion and changing the direction of travel.

Another object of the invention is the provision of a novel arrangement of friction cones and actuating means for shifting the cones to vary the speed and for releasing the cones from each other without stopping the engine when it is desired to stop the car or to coast.

With these objects in view, and others as will appear as the description proceeds, the invention comprises the various novel features of construction and arrangement of parts which will be more fully described hereinafter and set forth with particularity in the claims appended hereto.

Figure 3:
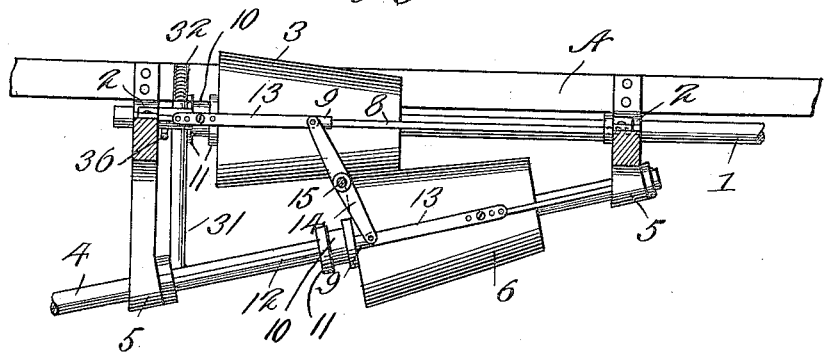
Figure 4:
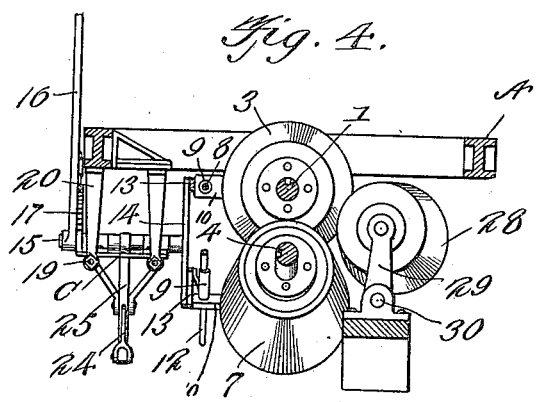
Figure 5:
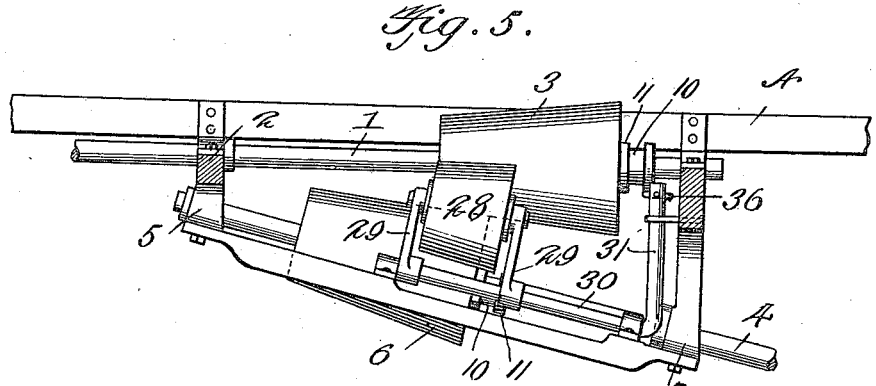

In the accompanying drawings, which illustrate one embodiment of the invention; Figure 1 is a plan view of the power transmitting mechanism. Fig. 2 is a side view thereof. Fig. 3 is a vertical longitudinal section taken on line 3—3 of Fig. 1. Fig. 4 is a transverse section on line 4—4 of Fig. 1. Fig. 5 is an elevation of the reversing cone side of the mechanism. Fig. 6 is a perspective view of the cone shifting mechanism. Fig. 7 is a perspective view of the reverse cone actuating means. Fig. 8 is a perspective view of the means for releasing the main cones from each other.

Similar reference characters are employed to designate corresponding parts throughout the several views.

Referring to the drawings, A designates the frame of the vehicle or other apparatus for which the power transmitting mechanism is used and mounted on this frame is an engine driven shaft 1, which rotates in bearings 2, and on the shaft is a driving cone 3, preferably made of fiber and of frusto-conical form, the taper of which depends upon the speed ratios desired. Directly under this shaft 1 is a driven shaft 4, mounted in bearings 5, on the frame A and provided with a cone 6 of substantially the same shape as the cone 3, but it is preferably faced with aluminum 7, with which the upper cone frictionally engages. The cones are feathered to their respective shafts and can slide longitudinally thereon, the shafts being disposed at an angle to each other so that the cones will be held in engagement by both being urged toward the apex of the angle, formed by the shafts, and furthermore, the disposition of the shafts is such that the cones can be moved longitudinally, one to the front and the other to the rear, while their peripheral faces will be disposed parallel and in contact during the operation. Mounted on the frame A in parallel relation to the shaft 1, is a guide-rod 8, on which slides a sleeve 9, which carries a shipper arm 10, which latter has its outer extremity engaged in an annular grooved hub or collar 11 on the larger end of the driving cone. Disposed under the guide-rod 8 is a second guide-rod 12, which is disposed parallel with and at one side of the driven shaft 4, and on this rod is another cone shifting device similar to that for the driving cone. The rear and forward ends of the sleeves 9, of the respective cone shifting devices are connected by links 13 with the upper and lower ends of a rocker 14, which rocker is secured to a horizontal transversely extending rock shaft 15, which is mounted on a secondary frame or carrier designated generally by C. The shaft 15 has one end terminating at the side of the vehicle and is equipped with an operating lever 16 that moves back and forth over a tooth sector 17, to which it can be locked by a latch device 18, in any position, the lever being used for changing this speed of travel.

When the lever is in forward position, the cones are engaged substantially their entire length and the vehicle propelled at its maximum speed and by shifting the lever rearwardly, the upper or driving cone is moved rearwardly and the lower or driven cone is moved forwardly, so that the speed ratio is changed to effect a lower speed of rotation of the driven shaft. It will thus be seen that the speed can be changed from minimum to maximum or vice-versa without stopping the engine or unclutching it from the driving shaft.

In order to hold the cones in frictional engagement with each other, the secondary frame or carrier is urged bodily in a forward direction and operates through the cone shifting devices to simultaneously move the cones forwardly or toward the apex of the triangle formed by the driving and driven shafts, thus bringing the cones toward each other. For this purpose, the frame C is provided with parallel supporting members 19, to slide in fixed bearings 20 on the main frame A and on the forward ends of the members 19 are springs 21, which are confined between retaining and tensioning adjusting nuts 22, on the said members and the adjacent bearings 20, so that the springs will tend to urge the supplemental frame or carrier C forwardly, the said frame forming the support for the change speed shifting mechanism connected with the cones. When it is desired to release the cones, the rearward movement is imparted to the frame or carrier C against the tension of the springs 21. This is effected by a lever pedal 23, mounted on the main frame A and connected by a link or rod 24 with the rocker 25 fulcrumed on the main frame at a point under the carrier, so that the upper end of the rocker can engage with the carrier or some suitable part mounted thereon, such as, for instance, the rock shaft 15 for imparting movement to the carrier. On the pedal 23, is a spring-pressed foot released latch 26 arranged to engage a catch or equivalent device 27 on the main frame. When the cones are engaging each other for propelling the vehicle, the latch is released from the catch 27, and the tension of the springs 21, operates through the carrier C and cone shifting devices to hold the cones engaged.

At the side of the main cones 3 and 6 opposite from the change speed mechanism is a reversing cone 28 that is journaled in upwardly extending arms 29 on the rock shaft 30 suitably supported on the main frame. The rear end of the rock shaft has an upwardly extending arm or crank 31, which is connected with a spring 32 that operates to hold the reversing cone away from the main cones. The tension of this spring is opposed whenever it is desired to reverse the direction of travel by the operator pressing a pedal 33, which is connected by a link 34 to a bell-crank lever 35, on the main frame, which lever is in turn connected by a link 36 with the crank arm 31 of the rock shaft 30. When the vehicle is driven forwardly, and it is desired to reverse the direction of travel, the operator first presses the pedal 23 forwardly to disengage the main cones from each other, the pedal being automatically locked in such position by the lock thereof. He then presses the pedal 33 to throw the reversing cone into engagement with the main cones so that the driving cone 3 will operate through the reversing cone to drive the driven cone 6 in the opposite direction. It will, of course, be understood that the driven shaft 4 is operatively connected with the driving wheels of the vehicle, so that the latter will turn in either direction for forward or reverse propulsion.

From the foregoing description taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that the apparatus shown is merely illustrative and that such changes may be made when desired as are within the scope of the invention.

What I claim as new and desire to secure by Letters Patent is:

1. In a power transmitting mechanism, the combination of a pair of obliquely arranged shafts mounted for rotation, sliding cones feathered to the shafts, a device operatively connected with both cones for shifting the latter longitudinally in opposite directions, means for movably mounting the device, means operating through the device for holding the cones in frictional engagement, and a controlling means for rendering the last-mentioned means inoperative when it is desired to disengage the cones.

2. In a power transmitting mechanism, the combination of obliquely arranged shafts, tapering cones slidably mounted thereon, means for shifting the cones simultaneously in opposite directions, springs acting on the said means to hold the cones frictionally engaged, and a controlling device connected with the said means for moving the latter in opposition to the springs to disengage the cones.

3. In a power transmitting mechanism, the combination of coacting cones, a rocker, connections between the ends of the rocker and the respective cones for shifting the latter in opposite directions, a movable support on which the rocker is mounted, springs acting on the support and through the rocker and the connections between the same and cones for holding the cones frictionally engaged, and manually-controlled means for moving the support in opposition to the springs to disengage the cones.

4. In a power transmitting mechanism, the combination of driving and driven shafts, cones mounted on the shafts and movable longitudinally thereof, guides extending parallel with the shafts and along the sides of the cones, cone shifting devices movable on the guides and disposed at the sides of the cones, and means for actuating the devices.

5. In a power transmitting mechanism, the combination of driving and driven shafts, cones mounted on the shafts and movable longitudinally thereof, guides extending parallel with the shafts and wholly to one side of the cones, cone shifting devices movable on the guides, a rocker, and means for connecting the rocker with the devices for simultaneously shifting the cones.

6. In a power transmitting mechanism, the combination of a pair of friction elements having relative longitudinal movements for changing the speed ratio, shifting devices movable parallel with the axes of the elements, a lever actuated rock shaft, a movable support for the shaft, connecting means between the shaft and devices for simultaneously shifting the elements in opposite directions, and controllable means pressing on the support and acting through said connecting means to normally hold the elements frictionally engaged.

7. In a power transmitting mechanism, the combination of driving and driven shafts arranged with their axes in converging relation, cones slidably mounted on and rotating with the shafts and tapering in the direction in which the shafts converge, guide rods disposed in parallel relation with the shafts, sleeves slidable on the rods, connections between the sleeves and cones, means for shifting the sleeves longitudinally to produce like movement of the cones, and means acting through the sleeves and connections and also through the shifting means to yieldingly hold the cones frictionally engaged.

8. In a power transmitting mechanism, the combination of driving and driven shafts arranged with their axes in obliquely converging relation, cones slidably mounted on and rotating with the shafts and tapering in the direction in which the shafts converge, and a device for yieldingly urging both cones in the same direction to hold them engaged, said device including guide rods disposed in parallel relation with the shafts, sleeves slidable on the rods, connections between the sleeves and cones, a controlling lever, and means for connecting the lever with both sleeves for actuating the same.

9. In a power transmitting mechanism, the combination of driving and driven shafts arranged with their axes in converging relation, cones slidably mounted on and rotating with the shafts and tapering in the direction in which the shafts converge, guide rods disposed in parallel relation with the shafts, sleeves slidable on the rods, connections between the sleeves and cones, a controlling lever, a rocker connected therewith, and links connected with the rocker and connected respectively with the opposite ends of the sleeves for shifting the cones simultaneously in opposite directions.

10. In a power transmitting mechanism, the combination of a pair of cones arranged with their axes at an angle to each other, means for urging the cones longitudinally to maintain their engagement, releasing means arranged to oppose the first mentioned means, and a reversing cone adapted to be thrown into engagement with both cones when they are released from each other.

11. In a power transmitting mechanism, the combination of longitudinally shiftable driving and driven elements, means operatively connected with the elements for simultaneously shifting them in opposite directions, and yielding means acting through the first mentioned means for releasably holding the cones in frictional engagement.

12. In a power transmitting mechanism, the combination of cones tapering in the same direction and arranged with their axes converging, a cone shifting change speed mechanism connected with the cones for moving them in opposite directions, means operating through the mechanism to urge the cones both in the same direction to maintain their frictional engagement, and a device acting through the mechanism, and in opposition to the said means for disengaging the cones.

13. In a power transmitting mechanism, the combination of co-acting longitudinally movable cones, a bodily movable mechanism for shifting the cones, tensioning means operating on the mechanism to hold the cones in engagement, and manually actuating means for opposing the first mentioned means to release the cones.

14. In a power transmitting mechanism, the combination of co-acting longitudinally movable cones, a spring-pressed carrier, cone shifting means mounted on the carrier and through which the latter operates to hold the cones in engagement, and a device for moving the carrier to release the cones from each other.

15. In a power transmitting mechanism, the combination of relatively shiftable cones, a carrier movable with respect to the cones, a shifting mechanism mounted on the carrier for moving the cones to change the speed, springs acting on the carrier to yieldingly hold the same in a position to maintain the cones frictionally engaged, a controlling device, and a connection between the device and carrier for moving the latter in a direction to release the cones from each other.

In testimony whereof I affix my signature in presence of two witnesses.

JOHN O. SCHWARTZ.

Witnesses:
 ED. ISLEY,
 SHERMAN NELIGH.

Copies of this patent may be obtained for five cents each, by addressing the "Commissioner of Patents, Washington, D. C."